(12) United States Patent
Cheng et al.

(10) Patent No.: US 9,059,831 B2
(45) Date of Patent: Jun. 16, 2015

(54) PILOT FREQUENCY SEQUENCE DETERMINATION

(71) Applicant: Empire Technology Development LLC, Wilmington, DE (US)

(72) Inventors: Xiang Cheng, Beijing (CN); Miaowen Wen, Shanghai (CN)

(73) Assignee: EMPIRE TECHNOLOGY DEVELOPMENT LLC, Wilmington, DE (US)

( * ) Notice: Subject to any disclaimer, the term of this patent is extended or adjusted under 35 U.S.C. 154(b) by 0 days.

(21) Appl. No.: 14/368,449

(22) PCT Filed: Jul. 26, 2013

(86) PCT No.: PCT/CN2013/080154
§ 371 (c)(1),
(2) Date: Jun. 24, 2014

(87) PCT Pub. No.: WO2015/010312
PCT Pub. Date: Jan. 29, 2015

(65) Prior Publication Data
US 2015/0078267 A1 Mar. 19, 2015

(51) Int. Cl.
*H04L 27/28* (2006.01)
*H04L 5/00* (2006.01)
*H04L 27/26* (2006.01)
*H04L 27/34* (2006.01)

(52) U.S. Cl.
CPC ............. *H04L 5/006* (2013.01); *H04L 5/0048* (2013.01); *H04L 27/2636* (2013.01); *H04L 27/3455* (2013.01)

(58) Field of Classification Search
CPC ......... H04L 5/00; H04L 5/0048; H04L 5/006; H04L 5/1438; H04L 5/0044; H04L 5/0007; H04L 27/26; H04W 4/00
USPC ................... 370/329, 242, 300, 210; 375/260
See application file for complete search history.

(56) References Cited

U.S. PATENT DOCUMENTS

| 6,608,843 | B1 * | 8/2003 | Murakami et al. | 370/500 |
| 2007/0133462 | A1 * | 6/2007 | Guey | 370/330 |
| 2009/0252092 | A1 * | 10/2009 | Yoshii | 370/329 |
| 2009/0285173 | A1 * | 11/2009 | Koorapaty et al. | 370/330 |
| 2010/0039927 | A1 | 2/2010 | Noh et al. | |

FOREIGN PATENT DOCUMENTS

| CN | 101267421 A | 9/2008 |
| CN | 102195906 A * | 9/2011 |

OTHER PUBLICATIONS

Dinis, R., "Joint frequency-domain equalization and channel estimation using superimposed pilots," in Proc. IEEE WCNC'2008, pp. 447-452, Apr. 2008.

(Continued)

*Primary Examiner* — Afsar M Qureshi
(74) *Attorney, Agent, or Firm* — Brundidge & Stanger, P.C.

(57) ABSTRACT

In an SC-FDE system, in accordance with FDPMT, a transmitter may be configured to replace data carried by one or more signals, e.g., one or more sub-carriers, with the data included in a pilot frequency sequence. The starting position of the pilot frequency sequence may affect the BER value of the system. The transmitter may then be configured to choose a proper starting position for the pilot frequency sequence so that the BER of the overall system may be minimum.

22 Claims, 4 Drawing Sheets

(56) References Cited

OTHER PUBLICATIONS

Falconer, D. et al., "Frequency domain equalization for single-carrier broadband wireless systems," IEEE Communications Magazine, vol. 40, No. 4, pp. 58-66, Apr. 2002.

Hasna, M. O., "Average BER of multichip communication systems over fading channels," in Proc. 10th IEEE International Conf. Electron., Circuits Syst., vol. 2, pp. 723-726, Dec. 2003.

Huang, W. C. et al, "On the power allocation and system capacity of OFDM systems using superimposed training schemes," IEEE Transactions on Vehicular Technology, vol. 58, No. 4, pp. 1731-1740, May 2009.

International Search Report for International Application No. PCT/CN2013/080154, mailed on Apr. 23, 2014.

Kim, D. et al.,"Pilot position selection and detection for channel estimation of SC-FDE,"IEEE Communications Letters, vol. 12, No. 5, pp. 350-352, May 2008.

Kim, D. et al., "A pilot design technique for single-carrier transmission over fast fading relay channels," in Proc. IEEE GLOBECOM'2008, pp. 1-5, Dec. 2008.

Kwon, U. K. et al., "Frequency domain pilot multiplexing technique for channel estimation of SC-FDE," Electronics Letters, vol. 44, No. 5, pp. 364-365, Feb. 2008.

Lam, C-T. et al., "Channel estimation for SC-FDE systems using frequency domain multiplexed pilots," in Proc. IEEE VTC'2006, pp. 1-5, Sep. 2006.

Lam, C-T. et al., "Iterative Frequency Domain Channel Estimation for DFT-Precoded OFDM Systems using In-Band Pilots," IEEE Journal on Selected Areas in Communications, vol. 26, No. 2, pp. 348-358, Feb. 2008.

Li, Y., "Pilot-symbol-aided channel estimation for OFDM in wireless systems," IEEE Transactions on Vehicular Technology, vol. 49, No. 4, pp. 1207-1215, Jul. 2000.

Lu, L. et al., "Novel robust pilot detection method for channel estimation in single-carrier frequency-domain equalization systems," in Proc. IEEE CMC'2011, pp. 437-440, Apr. 2011.

Seol, D. Y. et al., "Performance of single carrier transmission with cooperative diversity over fast fading channels," IEEE Transactions on Communications, vol. 57, No. 9, pp. 2799-2807, Sep. 2009.

Sheng, B. et al., "A simple pilot position detection technique for channel estimation of SC-FDE,"IEEE Communications Letters, vol. 14, No. 5, pp. 420-422, May 2010.

* cited by examiner

PILOT FREQUENCY SEQUENCE DETERMINATION

CROSS-REFERENCE TO RELATED APPLICATIONS

The present application is a U.S national stage filing under 35 U.S.C. §371 of International Application No. PCT/CN13/80154, filed on Jul. 26, 2013.

TECHNICAL FIELD

The technologies described herein pertain generally to determination of a starting position of pilot signals, e.g., a pilot frequency sequence.

BACKGROUND

Unless otherwise indicated herein, the approaches described in this section are not prior art to the claims in this application and are not admitted to be prior art by inclusion in this section.

In a single carrier block transmission with frequency domain equalization (SC-FDE) system, in accordance with frequency domain pilot multiplexing technique (FDPMT), a transmitter may be configured to replace data carried by one or more signals, e.g., one or more sub-carriers, with data included in a pilot frequency sequence. The starting position of the pilot frequency sequence may affect the bit-error-ratio (BER) value of the system.

SUMMARY

Technologies are generally described for pilot frequency sequence determination. The various techniques may be implemented in various devices, methods and/or systems.

In some examples, various techniques may be implemented as methods. Some methods may include modulating a binary source stream into one or more symbols; grouping the one or more symbols into one or more blocks; transforming each of the one or more blocks into a sequence that includes one or more signals; estimating multiple bit error rate (BER) values in anticipation of a plurality of the one or more signals being replaced by a pilot frequency sequence that starts at one of a plurality of possible positions of the sequence, each of which corresponds to one of the multiple BER values; and replacing the plurality of the one or more signals with the pilot frequency sequence that starts at a position corresponding to a lowest BER value among the estimated multiple BER values.

In some examples, various embodiments may be implemented as devices. Some devices may include a modulation component configured to modulate the binary source stream into one or more symbols and to group the one or more symbols into one or more blocks; a transformer component configured to transform each of the one or more blocks into a sequence that includes one or more signals; an estimator configured to estimate multiple BER values as if a plurality of the one or more signals are replaced with a pilot frequency sequence that starts at a number of positions of the sequence; an interposer configured to replace the plurality of the one or more signals with the pilot frequency sequence that starts at a position corresponding to a lowest BER value among the estimated multiple BER values; a reverse transformer component configured to transform the sequence into one of one or more reversed blocks; a coupler component configured to attach a cyclic prefix to each of the one or more reversed blocks to produce one or more information blocks; and an antenna configured to transmit multiple wireless signals that carry the one or more information blocks, each of which is attached with the cyclic prefix.

In some examples, various embodiments may be implemented as computer-readable mediums having executable instructions stored thereon. Some computer-readable mediums may store instructions that, when executed, cause one or more processors to perform operations comprising generating one or more sequences, each of which includes one or more signals; estimating multiple BER values in anticipation of a plurality of the one or more signals are replaced with a pilot frequency sequence that starts at a number of positions of the sequence, each of which corresponds to one of the multiple BER values; replacing the plurality of the one or more signals with the pilot frequency sequence that starts at a position corresponding to a lowest BER value among the estimated multiple BER values; reverse transforming the partially replaced sequence into one of one or more reversed blocks; attaching a cyclic prefix to each of the one or more reverse blocks to produce one or more information blocks; and transmitting multiple wireless signals that carry the one or more information blocks, each of which is attached with the cyclic prefix.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items. In the drawings.

DETAILED DESCRIPTION

Figure 1:
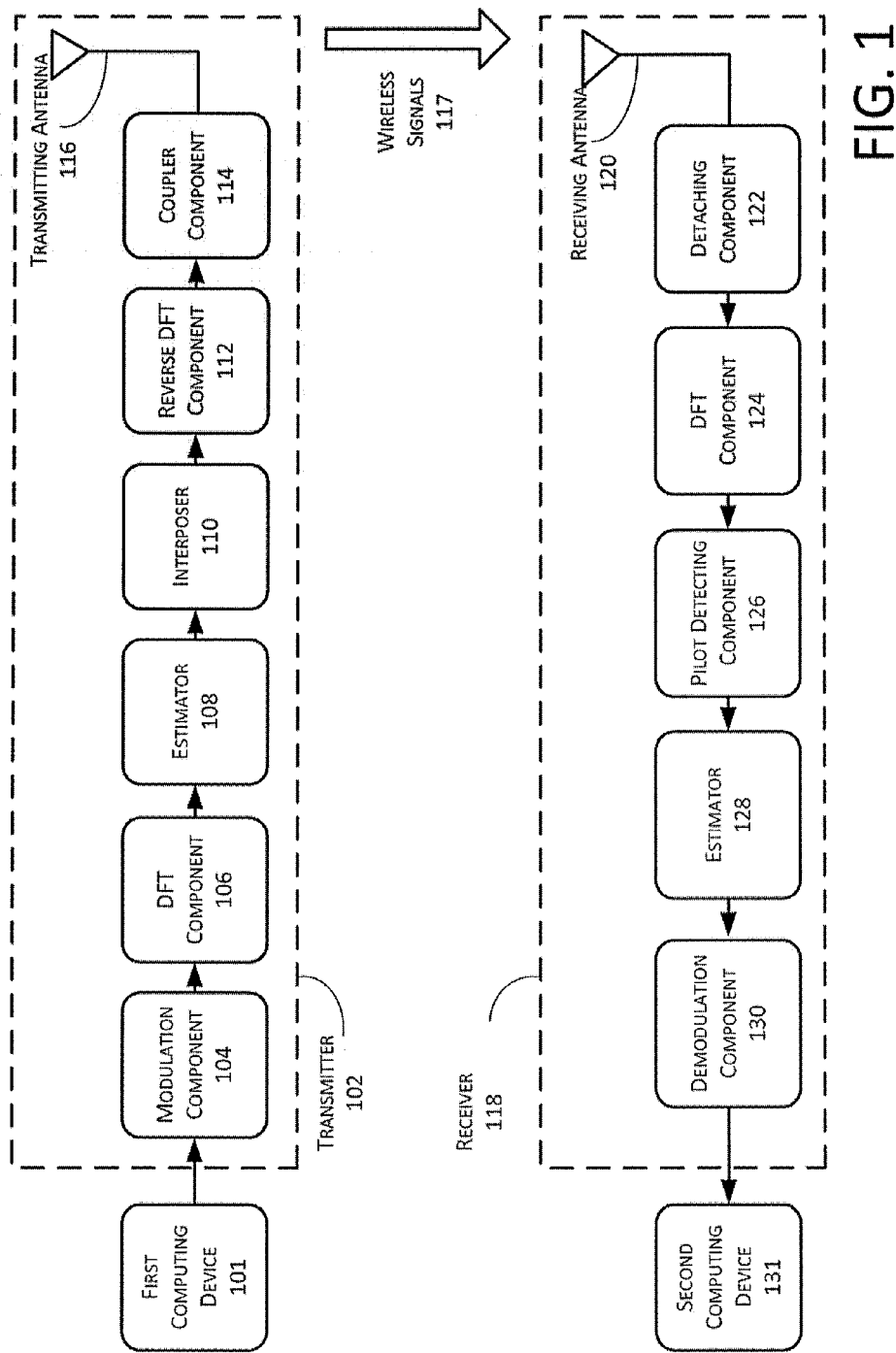
FIG. 1 shows an example system in which pilot frequency sequence determination may be implemented.

In the following detailed description, references are made to the accompanying drawings, which form a part of the description. In the drawings, similar symbols typically identify similar components, unless context dictates otherwise. Furthermore, unless otherwise noted, the description of each successive drawing may reference features from one or more of the previous drawings to provide clearer context and a more substantive explanation of the current example embodiment. Still, the embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

In a wireless communication system, a transmitter may be configured to transmit information generated by a first computing device to a second computing device. The information may be generated in a form of binary source stream, i.e., a series of binary code. In an SC-FDE wireless communication system, in accordance with FDPMT, the transmitter may be configured to replace data carried by one or more signals, e.g., one or more sub-carriers, with the data included in a pilot frequency sequence. The starting position of the pilot frequency sequence may affect the BER value of the system. The transmitter may then be configured to choose a proper starting position for the pilot frequency sequence so that the BER of the overall system may be minimum.

FIG. 1 shows an example system 100 in which pilot frequency sequence determination may be implemented, arranged in accordance with at least some embodiments described herein. As depicted, example system 100 may at least include a transmitter 102 that may include a modulation component 104, a Discrete Fourier Transform (DFT) component 106, an estimator 108, an interposer 110, a reverse DFT component 112, a coupler component 114, and a transmitting antenna 116; and a receiver 118 that may include a receiving antenna 120, a detaching component 122, a DFT component 124, a pilot detecting component 126, an estimator 128, and a demodulation component 130. Transmitter 102 may transmit one or more wireless signals to receiver 118.

First computing device 101 may refer to a physical device that may be configured to carry out instructions included in multiple software programs and to generate the binary source stream. The binary source stream may be transferred to transmitter 102.

Transmitter 102 may refer to an electronic device that may be configured to generate one or more wireless signals in accordance with any one of various wireless communication protocols, and further transmit the wireless signals via an antenna integrated therein. The various wireless communication protocols may include Time Division Duplex Long Term Evolution (TDD-LTE), Frequency Division Duplexing (FDD-LTE), IEEE 802.15.4, Global System for Mobile Communications (GSM), General Packet Radio Service (GPRS), Code Division Multiple Access (CDMA), 3rd generation of mobile telecommunications technology (3G), and etc.

Modulation component 104 may refer a software component, a hardware component, a firmware component, or a combination thereof, which may be configured to modulate the binary source stream, received from first computing device 101, into one or more symbols and to group the one or more symbols into one or more orthogonal frequency-division multiplexing (OFDM) blocks. In accordance with some examples, modulation component 104 may be configured to convert the binary source stream into one or more OFDM blocks in accordance with one of predetermined modulation methods that may include multiple quadrature amplitude modulation (QAM) methods that includes any of 4QAM, 8QAM, 16QAM, 32QAM, 64QAM, 128QAM, 256QAM, 512QAM, or 1024QAM. As referenced herein, OFDM blocks may refer to one or more data blocks that are encoded in accordance with any one of the aforementioned OFDM methods. Each one of the one or more OFDM blocks may include one or more subcarriers and may be referred to as $s=[s_0, \ldots, s_{N-1}]$.

DFT component 106 may refer to a software component, a hardware component, a firmware component, or a combination thereof, which may be configured to transform each of the one or more OFDM blocks in the time domain into a sequence that includes one or more signals, e.g., subcarriers, in the frequency domain. As referenced herein, frequency domain may refer to the domain for analysis of signals with respect to frequency, rather than time. That is, an analysis in the time domain may indicate how signals change over time, whereas an analysis in the frequency domain may indicate how the signals lie within each frequency band over a range of frequencies. Each of the one or more signals may carry an amount of digital or analog data that may include voice data in a wireless communication system. In accordance with some examples, the sequence may be calculated and referred to as $$S_k = \frac{1}{\sqrt{N}} \sum_{u=0}^{N-1} s_u e^{-j\frac{2\pi u k}{N}}, k = 0, \ldots, N-1.$$

Estimator 108 may refer to a software component, a hardware component, a firmware component, or a combination thereof, which may be configured to estimate multiple possible BER values as if the data carried by a plurality of the one or more signals are replaced with a pilot frequency sequence that starts at a number of positions of the sequence. In accordance with some examples, the pilot frequency sequence may be predetermined by transmitter 102 and receiver 118, e.g., a pseudo noise sequence. Since transmitter 102 may choose the starting position of the pilot frequency sequence, which may cause different BER values for the entire system, estimator 108 may calculate all possible BER values corresponding to the different starting positions and determine a starting position corresponding to a lowest BER value.

Interposer 110 may refer to a software component, a hardware component, a firmware component, or a combination thereof, which may be configured to replace the data carried by the plurality of the one or more signals with the pilot frequency sequence that starts at a position corresponding to a lowest BER value among the estimated multiple BER values. In some examples, the plurality of the one or more signals may be equally distanced from each other. When the original sequence $S_k$ is referenced as above, the pilot frequency sequence of length $N_p$ may be referred to as $C=[C_0, \ldots, C_{N_p-1}]$. The sequence inserted with the pilot frequency sequence may be referred to as: $X_{d_0}=[S_0, \ldots, S_{d_0-1}, C_0, S_{d_0+1}, \ldots, S_{M+d_0-1}, C_1, S_{M+d_0+1}, \ldots, S_{(N_p-1)M+d_0-1}, C_{N_p-1}, S_{(N_p-1)M+d_0+1}, S_{(N_p-1)M+d_0+2}, \ldots, S_{N-1}]$. The equal distance between the plurality of the one or more signals may be referred to as $M=N/N_p$, when $d_0$ may refer to the starting position of the pilot frequency sequence.

Reverse DFT component 112 may refer to a software component, a hardware component, a firmware component, or a combination thereof, which may be configured to transform the sequence, $X_{d_0}$, in the frequency domain into one of one or more reversed blocks in the time domain that may be referred to as $$X_{d_0,u} = \frac{1}{\sqrt{N}} \sum_{k=0}^{N-1} X_k e^{j\frac{2\pi u k}{N}}, k = 0, \ldots, N-1.$$

Coupler component 114 may refer to a software component, a hardware component, a firmware component, or a combination thereof, which may be configured to attach a cyclic prefix of length $C_p$ to each of the one or more reversed blocks to produce one or more corresponding information blocks. A cyclic prefix may refer to a prefixing of a symbol with a repetition of the end and may serve the purpose of eliminating intersymbol interferences. In some examples, the length of $C_p$ is longer than the maximum delay caused by multipath effect. "Multipath effect" as referenced herein may refer to the propagation of a radio signal through multiple paths for which part of the signal energy is received before another part of the signal is received that is delayed in time. Multipath delay may be caused by the extra travel time for the other part of the radio signal that may have been reflected from an obstacle.

Transmitting antenna 116 may refer to a physical device that may be configured to transmit multiple wireless signals, e.g., wireless signals 117, which carry the one or more information blocks to which the cyclic prefix is attached.

Receiver 118 may refer to an electronic device that may be configured to receive wireless signal 117 from transmitter 102, and to convert the received wireless signals 117 into a target binary stream that may be further processed by a second computing device or communication device.

Receiving antenna 120 may refer to a physical device that may be configured to receive, from transmitter 102, wireless signals 117 that carry the one or more information blocks to which the cyclic prefix is attached.

Detaching component 122 may refer to a software component, a hardware component, a firmware component, or a combination thereof, which may be configured to detach the cyclic prefix from each of the one or more information blocks to produce one or more corresponding OFDM blocks.

DFT component 124 may refer to a software component, a hardware component, a firmware component, or a combination thereof, which may be configured to transform each of the one or more OFDM blocks in the time domain into a received sequence in the frequency domain. The received sequence may be referred to as $R_{d_0}=[R_{d_0,0}, \ldots R_{d_0,N-1}]$.

Pilot detecting component 126 may refer to a software component, a hardware component, a firmware component, or a combination thereof, which may be configured to detect the starting position of the pilot frequency sequence inserted by interposer 110. Further, pilot detecting component 126 may further extract data contained in the pilot frequency sequence, which may be referred to as $\{R_{d_0,k}, k \pmod{M}=d_0\}$.

Estimator 128 may refer to a software component, a hardware component, a firmware component, or a combination thereof, which may be configured to estimate the channel impulse response (CIR) corresponding to the channel carried by the subcarriers in accordance with linear interpolation method, triangular interpolation method, zero-forcing equalization method, etc. As referenced herein, a CIR may refer to a response signal, as an output of a channel, to a standard impulse signal as an input. Further, estimator 128 may be configured to estimate the modulated symbols based on the estimated CIR.

Demodulation component 130 may refer to a software component, a hardware component, a firmware component, or a combination thereof, which may be configured to demodulate the estimated symbols to produce the target binary stream that may be processed by the second computing device or communication device.

Second computing device 131 may refer to a physical device that may be configured to receive the target binary stream and to extract the information included therein for further process.

Figure 2:
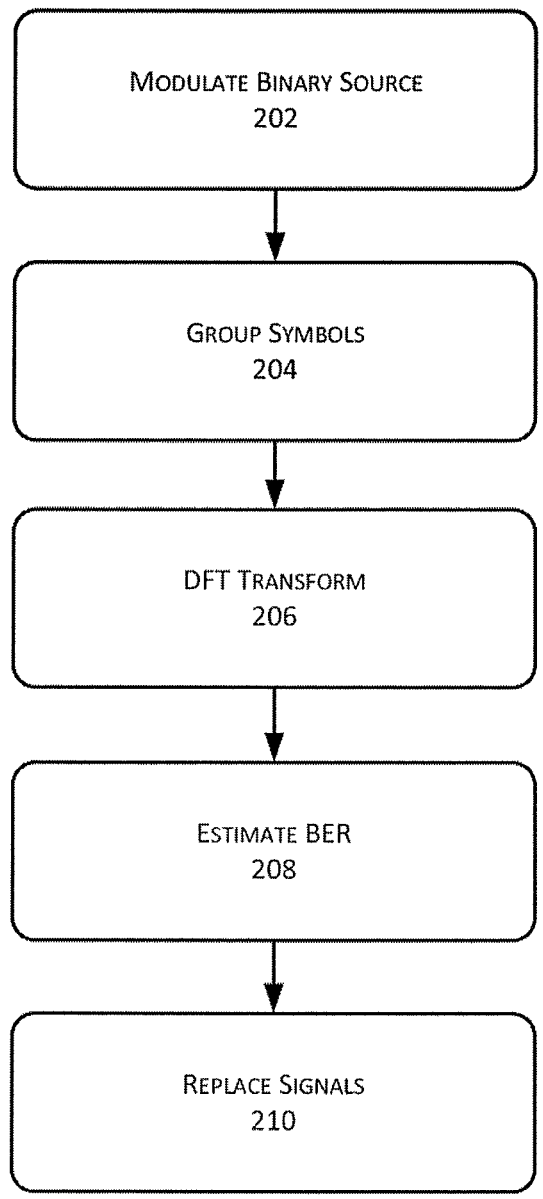
FIG. 2 shows an example configuration of a processing flow of operations by which pilot frequency sequence determination may be implemented.

FIG. 2 shows an example configuration 200 of a processing flow of operations by which pilot frequency sequence determination may be implemented, arranged in accordance with at least some embodiments described herein. As depicted, processing flow 200 may include sub-processes executed by various components that are part of example system 100. However, processing flow 200 is not limited to such components, and modification may be made by re-ordering two or more of the sub-processes described here, eliminating at least one of the sub-processes, adding further sub-processes, substituting components, or even having various components assuming sub-processing roles accorded to other components in the following description. Processing flow 200 may include various operations, functions, or actions as illustrated by one or more of blocks 202, 204, 206, 208, and/or 210. Processing may begin at block 202.

Block 202 (Modulate Binary Source) may refer to modulation component 104 modulating the binary source stream into one or more symbols in accordance with one of predetermined modulation methods that may include multiple QAM methods that includes any of 4QAM, 8QAM, 16QAM, 32QAM, 64QAM, 128QAM, 256QAM, 512QAM, or 1024QAM. Processing may continue from block 202 to block 204.

Block 204 (Group Symbols) may refer to modulation component 104 grouping the one or more symbols into one or more OFDM blocks. Each of the one or more OFDM blocks may include one or more subcarriers. Processing may continue from block 204 to block 206.

Block 206 (DFT Transform) may refer to DFT component 106 transforming each of the one or more OFDM blocks in the time domain into a sequence that includes one or more signals, e.g., subcarriers, in the frequency domain. Each of the one or more signals may carry an amount of data. Processing may continue from block 206 to block 208.

Block 208 (Estimate BER) may refer to estimator 108 estimating multiple possible BER values as if the data carried by a plurality of the one or more signals are replaced with a pilot frequency sequence that starts at a number of positions of the sequence. In accordance with some examples, transmitter 102 may choose the starting position of the pilot frequency sequence, which may cause different BER values of the entire system. Estimator 108 may be configured to calculate all possible BER values corresponding to the different starting positions and determine a starting position corresponding to a lowest BER value. Alternatively, in accordance with some example, estimator 108 may be configured to sort the possible BER values corresponding to different starting position of the pilot frequency sequence, instead of first calculating the accurate BER values. Processing may continue from block 208 to block 210.

Block 210 (Replace Signals) may refer to interposer 110 replacing the data carried by the plurality of the one or more signals with the pilot frequency sequence that starts at a position corresponding to a lowest BER value among the estimated multiple BER values. In some examples, the plurality of the one or more signals to be replaced may be equally distanced from each other.

Thus, FIG. 2 shows an example configuration 200 of a processing flow of operations by which pilot frequency sequence determination may be implemented.

Figure 3:
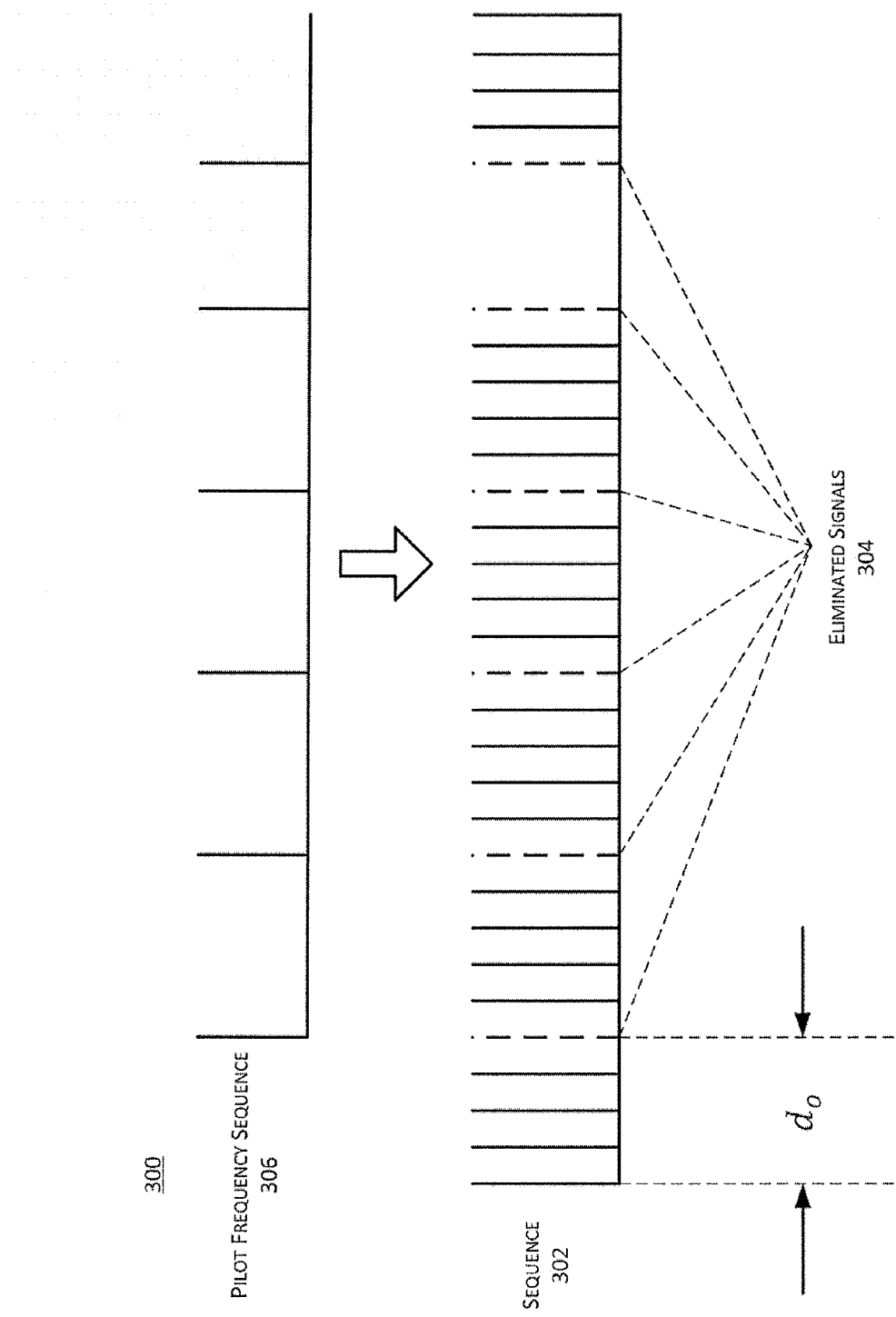
FIG. 3 shows an example illustration of a replacing process by which pilot frequency sequence determination may be implemented.

FIG. 3 shows an example process 300 described by block 210 (Replace Signals) by which pilot frequency sequence determination may be implemented, arranged in accordance with at least some embodiments described herein. As depicted, example process 300 may include replacing portions of sequence 302, i.e., eliminated signals 304, with pilot frequency sequence 306.

Sequence 302 may refer to one or more signals in the frequency domain, which may be transformed from each of one or more OFDM blocks. Each of the one or more signals may refer to a respective subcarrier that carries an amount of data.

Eliminated signals 304 may refer to a plurality of the one or more signals that start at a position of sequence 302 ($d_0$) and are equally distanced by M ($M=N/N_p$). The data carried by eliminated signals 304 may be deleted and replaced by the data included in pilot frequency sequence 306.

Pilot frequency sequence 306 may refer to a sequence of one or more signals that carry information known to receiver 118. In accordance with some examples, the pilot frequency sequence is predetermined by transmitter 102 and receiver 118, e.g., a pseudo noise sequence.

Thus, FIG. 3 shows an example process 300 may include replacing portions of sequence 302, i.e., eliminated signals 304, with pilot frequency sequence 306.

Figure 4:
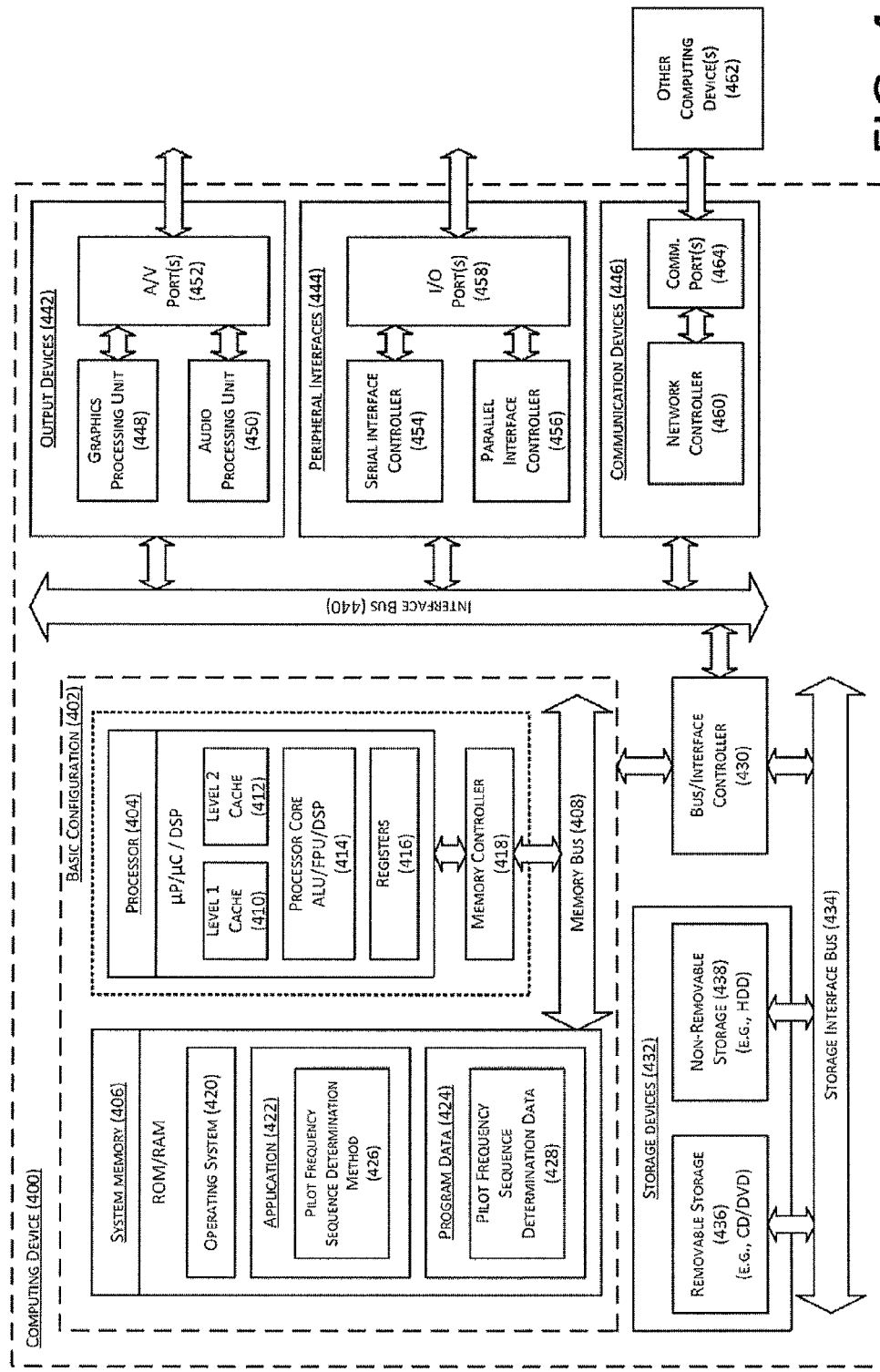
FIG. 4 shows a block diagram illustrating an example computing device that is arranged for pilot frequency sequence determination, all arranged in accordance with at least some embodiments described herein.

FIG. 4 shows a block diagram illustrating an example computing device 400 that is arranged for pilot frequency sequence determination, arranged in accordance with at least some embodiments described herein.

In a very basic configuration 402, computing device 400 typically includes one or more processors 404 and a system memory 406. A memory bus 408 may be used for communicating between processor 404 and system memory 406.

Depending on the desired configuration, processor 404 may be of any type including but not limited to a microprocessor (µP), a microcontroller (µC), a digital signal processor (DSP), or any combination thereof. Processor 404 may include one more levels of caching, such as a level one cache 410 and a level two cache 412, a processor core 414, and registers 416. An example processor core 414 may include an arithmetic logic unit (ALU), a floating point unit (FPU), a digital signal processing core (DSP Core), or any combination thereof. An example memory controller 418 may also be used with processor 404, or in some implementations memory controller 418 may be an internal part of processor 404.

Depending on the desired configuration, system memory 406 may be of any type including but not limited to volatile memory (such as RAM), non-volatile memory (such as ROM, flash memory, etc.) or any combination thereof. System memory 406 may include an operating system 420, one or more applications 422, and program data 424. Application 422 may include a pilot frequency sequence determination method 426 that is arranged to perform the functions as described herein including those described with respect to process 200 of FIG. 2 that may include block 202 (Modulate Binary Source), block 204 (Group Symbols), block 206 (DFT transform), block 208 (Estimate BER), and block 210 (Replace Signals). Program data 424 may include pilot frequency sequence determination data 428 that may be useful for operation with pilot frequency sequence determination method 426 as is described herein. In some embodiments, application 422 may be arranged to operate with program data 424 on operating system 420 such that implementations of pilot frequency sequence determination may be provided as described herein. This described basic configuration 402 is illustrated in FIG. 4 by those components within the inner dashed line.

Computing device 400 may have additional features or functionality, and additional interfaces to facilitate communications between basic configuration 402 and any required devices and interfaces. For example, a bus/interface controller 430 may be used to facilitate communications between basic configuration 402 and one or more data storage devices 432 via a storage interface bus 434. Data storage devices 432 may be removable storage devices 436, non-removable storage devices 438, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 406, removable storage devices 436 and non-removable storage devices 438 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 400. Any such computer storage media may be part of computing device 400.

Computing device 400 may also include an interface bus 440 for facilitating communication from various interface devices (e.g., output devices 442, peripheral interfaces 444, and communication devices 446) to basic configuration 402 via bus/interface controller 430. Example output devices 442 include a graphics processing unit 448 and an audio processing unit 450, which may be configured to communicate to various external devices such as a display or speakers via one or more A/V ports 452. Example peripheral interfaces 444 include a serial interface controller 454 or a parallel interface controller 456, which may be configured to communicate with external devices such as input devices (e.g., keyboard, mouse, pen, voice input device, touch input device, etc.) or other peripheral devices (e.g., printer, scanner, etc.) via one or more I/O ports 458. An example communication device 446 includes a network controller 460, which may be arranged to facilitate communications with one or more other computing devices 462 over a network communication link via one or more communication ports 464.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 400 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 400 may also be implemented as a personal computer including both laptop computer and non-laptop computer configurations.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method for determining a starting position of pilot signals, comprising:
    modulating a binary source stream into one or more symbols;
    grouping the one or more symbols into one or more blocks;
    transforming each of the one or more blocks into a sequence that includes one or more signals, each of which carries an amount of data;
    estimating multiple bit error rate (BER) values in anticipation of the amount data carried by a plurality of the one or more signals being replaced by a pilot frequency sequence that starts at one of a plurality of possible positions of the sequence, each of which corresponds to one of the multiple BER values; and
    replacing the amount of data carried by the plurality of the one or more signals with the pilot frequency sequence that starts at a position corresponding to a lowest BER value among the estimated multiple BER values.

2. The method of claim 1, wherein the modulating includes modulating in accordance with one of multiple quadrature amplitude modulation (QAM) methods.

3. The method of claim 1, wherein each of the one or more blocks includes one or more subcarriers, each of which carries information at a fixed frequency.

4. The method of claim 1, wherein the transforming is a discrete Fourier transform (DFT).

5. The method of claim 1, wherein the estimating includes selecting multiple equally distanced signals in the frequency domain as the plurality of the one or more signals.

6. The method of claim 1, wherein the pilot frequency sequence is a pseudo noise sequence.

7. The method of claim 5, wherein a distance between two adjacent signals of the plurality of the one or more signals is a result of dividing the number of signals of the sequence by the number of signals of the pilot frequency sequence.

8. A device to transmit information, comprising:
    a modulation component configured to modulate the binary source stream into one or more symbols and to group the one or more symbols into one or more blocks;
    a transformer component configured to transform each of the one or more blocks into a sequence that includes one or more signals, each of which carries an amount of data;
    an estimator configured to estimate multiple BER values as if the amount of data carried by a plurality of the one or more signals are replaced with a pilot frequency sequence that starts at a number of positions of the sequence;
    an interposer configured to replace the amount of data carried by the plurality of the one or more signals with the pilot frequency sequence that starts at a position corresponding to a lowest BER value among the estimated multiple BER values;
    a reverse transformer component configured to transform the sequence into one of one or more reversed blocks;
    a coupler component configured to attach a cyclic prefix to each of the one or more reversed blocks to produce one or more information blocks; and
    an antenna configured to transmit multiple wireless signals that carry the one or more information blocks, each of which is attached with the cyclic prefix.

9. The device of claim 8, wherein the modulation component is configured to modulate the binary source stream in accordance with one of multiple quadrature amplitude modulation (QAM) methods that include any of 4QAM, 8QAM, 16QAM, 32QAM, 64QAM, 128QAM, 256QAM, 512QAM, or 1024QAM.

10. The device of claim 8, wherein the each of the one or more blocks includes one or more subcarriers, each of which carries information at a fixed frequency.

11. The device of claim 8, wherein the transformer component is configured to transform each of the one or more blocks in accordance with DFT.

12. The device of claim 8, wherein the plurality of the one or more signals are equally distanced from each other in the frequency domain.

13. The device of claim 8, wherein the pilot frequency sequence is a pseudo noise sequence.

14. The device of claim 12, wherein a distance between two adjacent signals of the plurality of the one or more signals is determined by the number of signals of the sequence and the number of signals of the pilot frequency sequence.

15. A non-transitory computer-readable medium storing instructions that, when executed, cause one or more processors to perform operations comprising:
   generating one or more sequences, each of which includes one or more signals, each of which carries an amount of data;
   estimating multiple bit error rate (BER) values in anticipation of the amount of data carried by a plurality of the one or more signals are replaced with a pilot frequency sequence that starts at a number of positions of the sequence, each of which corresponds to one of the multiple BER values;
   replacing the amount of data carried by the plurality of the one or more signals with the pilot frequency sequence that starts at a position corresponding to a lowest BER value among the estimated multiple BER values;
   reverse transforming the partially replaced sequence into one of one or more reversed blocks;
   attaching a cyclic prefix to each of the one or more reverse blocks to produce one or more information blocks; and
   transmitting multiple wireless signals that carry the one or more information blocks, each of which is attached with the cyclic prefix.

16. The non-transitory computer-readable medium as recited in claim 15, wherein the modulating comprises modulating in accordance with one of multiple quadrature amplitude modulation (QAM) methods that include any of 4QAM, 8QAM, 16QAM, 32QAM, 64QAM, 128QAM, 256QAM, 512QAM, or 1024QAM.

17. The non-transitory computer-readable medium as recited in claim 15, wherein each of the one or more blocks includes one or more subcarriers, each of which carries information at a fixed frequency.

18. The non-transitory computer-readable medium as recited in claim 15, wherein the transforming is conducted in accordance with DFT.

19. The non-transitory computer-readable medium as recited in claim 15, wherein the estimating includes selecting multiple equally distanced signals in the frequency domain as the plurality of the one or more signals.

20. The non-transitory computer-readable medium as recited in claim 15, wherein the pilot frequency sequence is a pseudo noise sequence.

21. The non-transitory computer-readable medium as recited in claim 15, wherein the generating includes:
   modulating a binary source stream into one or more symbols;
   grouping the one or more modulated symbols into one or more blocks; and
   transforming each of the one or more blocks into one of the one or more sequences.

22. The non-transitory computer-readable medium as recited in claim 19, wherein the distance between two adjacent signals of the plurality of the one or more signals is determined by one or more parameters including the number of signals of the sequence and the number of signals of the pilot frequency sequence.

* * * * *

UNITED STATES PATENT AND TRADEMARK OFFICE
CERTIFICATE OF CORRECTION

| | | |
|---|---|---|
| PATENT NO. | : 9,059,831 B2 | Page 1 of 1 |
| APPLICATION NO. | : 14/368449 | |
| DATED | : June 16, 2015 | |
| INVENTOR(S) | : Cheng et al. | |

It is certified that error appears in the above-identified patent and that said Letters Patent is hereby corrected as shown below:

IN THE SPECIFICATION

In Column 4, Line 54, delete "$M=N/N_p$," and insert -- $M=N/N_p$ --, therefor.

In Column 5, Line 42, delete "$R_{d_0} = [R_{d_0,0}, \ldots R_{d_0,N-1}].$" and insert -- $R_{d_0} = [R_{d_0,0}, \ldots, R_{d_0,N-1}].$ --, therefor.

Signed and Sealed this
Twenty-fourth Day of November, 2015

Michelle K. Lee
*Director of the United States Patent and Trademark Office*